(No Model.)

J. G. WATSON.
HARVESTER BINDER.

No. 324,283. Patented Aug. 11, 1885.

Witnesses.
J. B. Featherstonhaugh
Jas. E. Maybee

Inventor.
J. G. Watson
by
Donald C. Ridout & Co,
Attys

N. PETERS, Photo-Lithographer, Washington, D. C.

UNITED STATES PATENT OFFICE.

JOHN GEORGE WATSON, OF AYR, ONTARIO, CANADA.

HARVESTER-BINDER.

SPECIFICATION forming part of Letters Patent No. 324,283, dated August 11, 1885.

Application filed September 25, 1884. (No model.) Patented in Canada May 12, 1885, No. 21,658.

*To all whom it may concern:*

Be it known that I, JOHN GEORGE WATSON, of the village of Ayr, in the county of Waterloo, in the Province of Ontario, Canada, manufacturer of agricultural implements, have invented certain new and useful Improvements in Harvester-Binders; and I do hereby declare that the following is a full, clear, and exact description of the same.

The object of the invention is to provide means by which a harvester-binder may be reduced in width, so as to enable it to be driven through an ordinary farm-gate; and it consists, essentially, in so connecting the frame on which the binding mechanism and table are supported to the main frame of the machine that the said binder table and mechanism may be swung around from its normal position to the rear of the machine.

Figure 1:
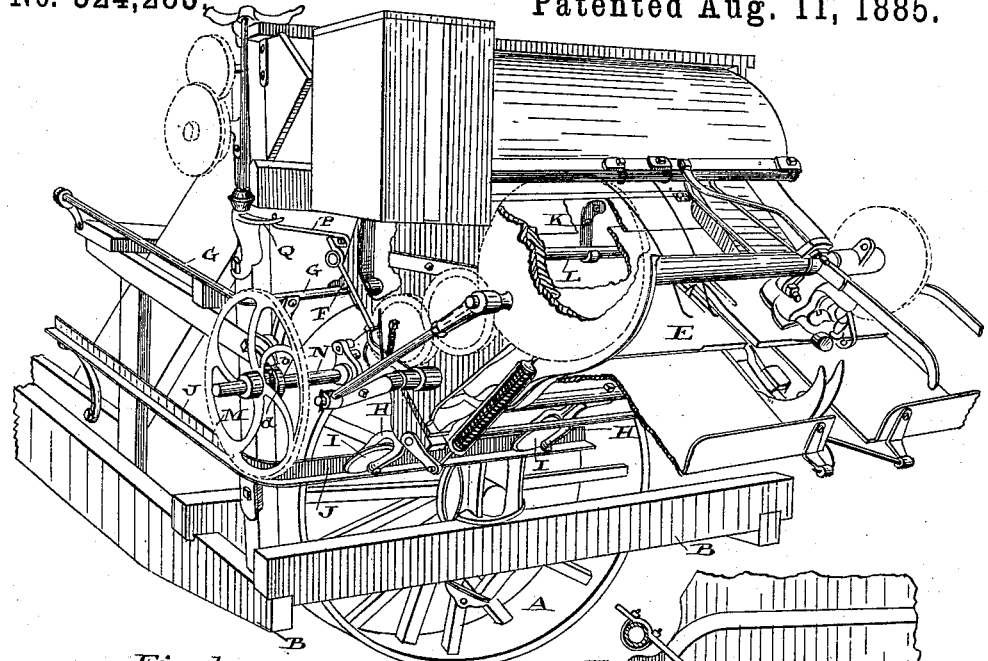
Figure 3:
Figure 2:
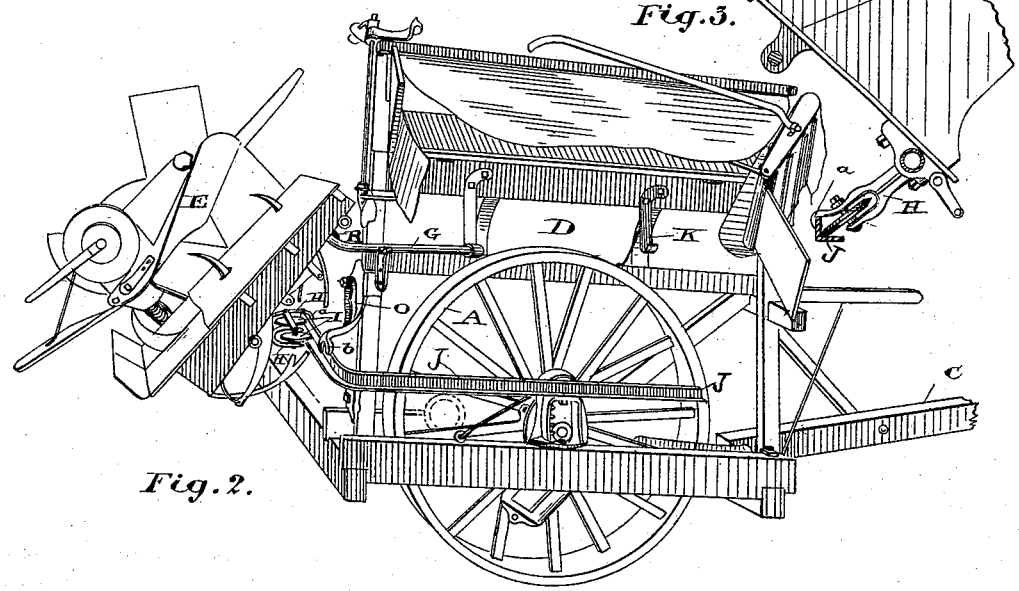

Figure 1 is a perspective view showing the parts involved in my invention in the position that they will rest in when the binder-table and its mechanism is located in its normal position at the side of the machine where the sheaves are bound. Fig. 2 is a similar view, but showing the binding-table and its mechanism swung around to the rear of the machine. Fig. 3 is a detail showing the brackets and friction-rollers by which the frame of the binding mechanism is supported.

I am aware that other devices have been designed for the purpose of reducing the width of a harvester-binder; but in all such devices with which I am familiar the binding-table, with its mechanism, is arranged to fold upwardly or downwardly so as to reduce the width of the machine. The mechanism or table is not in any device with which I am familiar removed from the side of the machine, but, as stated, merely folded up to reduce the width of the machine to the extent of the fold.

By my invention I am enabled to reduce the width of the machine to the extent of the width of the binder-table and its mechanism by simply connecting the frame of the binder-table to the main frame of the machine so that the whole mechanism and its table may be swung around from its normal position at the side of the machine to the rear or back end of the same.

In the drawings I have not shown the entire machine, but have merely shown such parts as immediately relate to my invention.

A represents the main driving-wheel of the machine; B, the main frame, supported thereon, and C the tongue, the location of the latter indicating the front of the machine.

D represents the elevating-canvas, and E represents the binding-table and its mechanism. As these portions of the machine are merely of the ordinary construction, it is not necessary to describe them in detail. It will be sufficient for my purpose to say that instead of attaching the binding-table and its mechanism permanently to the side of the machine in the position indicated in Fig. 1, it is so arranged that it may be lifted entirely clear of the main frame of the machine, being merely connected thereto by hooked brackets and friction-wheels, which I shall now proceed to describe. The hooked bracket F is bolted or otherwise secured to the frame of the binding-table E, and hooks, as indicated, over the rod G, which is secured rigidly to the main frame B of the machine by brackets or otherwise, substantially as shown in the drawings.

H is the bracket bolted to the frame of the binding-table E, and having journaled in it the friction-roller I, which rests upon and works within the angle-iron track J, which is rigidly fastened, as indicated, to the main frame B of the machine. It will be noticed that one side of the bracket H extends beyond the bearing formed in it for the friction-roller I, and has a hooked end, *a*, which fits over the top edge of the angle-iron track J. This tends to form a good connection between the bracket H and the angle-iron track J during the period that the binding-table is resting in position, while the hooked end of the bracket H does not form any obstruction to the free movement of the friction-roller I around the track J. I have spoken of the friction-roller I and bracket H in the singular; but, as will be seen by the drawings, there are two friction-rollers situated on opposite sides of the frame of the binding-table, so as to support it in a proper position.

K is a hooked bracket fastened to the frame of the machine immediately below the elevating-canvas, and designed to receive the pipe or rod L, which forms part of the frame of the binding-table, and rests in the bracket K when the binding-table is in the position indicated in Fig. 1.

M is the sprocket-wheel fitted onto the packer-shaft N, from which the entire binding mechanism derives its motion, the sprocket-wheel M being geared with the main driving mechanism of the machine.

O is a bracket bolted to the main frame of the machine and having a forked end, b, which fits into a groove formed around the hub d of the sprocket-wheel M. The bracket O thus supports the end of the packer-shaft N, and also holds the sprocket-wheel M in position, the connection between the sprocket-wheel M and packer-shaft N being such that, while the packer-shaft N must revolve with the sprocket-wheel M, the said packer-shaft may be moved freely longitudinally through the sprocket-wheel, so as to permit the lateral adjustment of the frame of the binding-table, which is accomplished in all harvester-binders of the construction illustrated. The bolt which secures the bracket O to the main frame of the machine passes through a slotted passage-way in the said bracket, so that when the bolt is loosened the bracket O may be moved away from the position it stands in when supporting the end of the packer-shaft.

The foregoing describes all the mechanism involved in my invention, and I shall now proceed to describe its operation.

When the binding-table E and its mechanism is located in the position shown in Fig. 1, it is in its proper place to receive and manipulate the grain as it is discharged from the frame B. When in this position, the roller I rests upon the track J, and the hooked end a of the brackets H fit over the top edge of the track, thereby tending to retain them in position. The hooked bracket F, located on one side of the binding-table frame near its top, fits over the rod G, while the other top side of the binding-table frame is supported by the rod or pipe L, resting in the hooked bracket K. These constitute the entire support of the binding-table frame and its mechanism. When the binding mechanism is in this position, it is operated by the sprocket-wheel M, and lateral adjustment to the binding-table is imparted by the rod P, which is hooked into the crank-rod Q, which is journaled, as indicated, in the main frame of the machine. Before the binding-table and its mechanism can be moved from the position indicated in Fig. 1 to the position it is shown in in Fig. 2, the rod P is first disconnected from the crank-rod Q. The bolt which secures the bracket O to the frame is loosened when the slotted hole through the said bracket permits it to be dropped clear of the hub d, thereby allowing the sprocket-wheel M to be drawn off the shaft N. The operator then seizes the opposite side of the binding-table E, lifts the rod L clear of the hooked bracket K, when, by pulling at the side of the table he has hold of, the operator is enabled to push the whole table and its mechanism around the track J into the position indicated in Fig. 2, the rollers I supporting the bottom of the binding-table E, while the hooked bracket F slides around the rod G and holds the top of the binding-table E. When the table is thus pushed around to the rear of the machine, as indicated in Fig. 2, the operator drops the side of the machine he has hold of till the hooked bracket R catches upon the rod G, which completes the operation and leaves the binding-frame and its mechanism at the rear of the machine, thereby reducing the width of the machine a measurement equal to the space occupied by the binding-table when in its normal position, as indicated in Fig. 1.

I might mention here that the hooked bracket R only is brought into action when the binding-table is thrown around into the position it is illustrated in in Fig. 2. When the binding-table is in the position indicated in Fig. 1, the hooked bracket R is not utilized, the portion of the table E which is supported by it when in the position shown in Fig. 2, being carried by the rod L, resting in the hooked bracket K.

What I claim as my invention is—

1. In a harvester-binder, in which the binding mechanism and binding-table are all connected to the same frame, mechanism arranged to support the said frame on the main frame of the machine, in the manner substantially as described, whereby the said frame and its mechanism may be moved bodily from the side of the machine to its rear.

2. A rod, G, connected to the frame B and extending from the side to the rear of the machine, in combination with the hooked brackets F, arranged to detachably connect the frame of the binding-table E to the main frame of the machine.

3. The hooked brackets F, near the top side of the frame of the binding-table E, the bracket or brackets H, connected near the bottom side to the frame of the binding-table E, and preferably provided with friction rollers, in combination with the rod G and track J, substantially as and for the purpose specified.

4. The bracket H, fastened to the frame of the binding-table E and provided with a friction-roller, I, arranged to rest upon and roll on the angle-iron track J, in combination with a hook end, d, arranged to fit over the top edge of the track J, substantially as and for the purpose specified.

5. The bracket O, having a slot through which the bolt passes which connects it to the main frame of the machine, in combination with the hub d, formed on a sprocket-wheel, M, and having a groove through which the forked end b of the bracket O fits, substantially as and for the purpose specified.

JOHN GEO. WATSON.

Toronto, September 19th, 1884.
In presence of—
 CHARLES C. BALDWIN,
 F. BARNARD FETHERSTONHAUGH.